(12) United States Patent
Gaza et al.

(10) Patent No.: US 9,959,323 B2
(45) Date of Patent: *May 1, 2018

(54) METHOD FOR PROCESSING A DATABASE QUERY

(71) Applicant: International Business Machines Corporation, Armonk, NY (US)

(72) Inventors: Lukasz Gaza, Jankowice (PL); Artur M. Gruszecki, Kraków (PL); Tomasz Kazalski, Kraków (PL); Konrad K. Skibski, Zielonki (PL); Tomasz Stradomski, Będzin (PL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/064,662

(22) Filed: Mar. 9, 2016

(65) Prior Publication Data
US 2016/0239538 A1    Aug. 18, 2016

Related U.S. Application Data

(63) Continuation of application No. 14/621,466, filed on Feb. 13, 2015.

(51) Int. Cl.
*G06F 17/30* (2006.01)

(52) U.S. Cl.
CPC .. *G06F 17/30536* (2013.01); *G06F 17/30424* (2013.01); *G06F 17/30864* (2013.01)

(58) Field of Classification Search
None
See application file for complete search history.

(56) References Cited

U.S. PATENT DOCUMENTS

| 6,973,452 B2 | 12/2005 | Metzger et al. |
| 7,010,522 B1 | 3/2006 | Jagadish et al. |

(Continued)

FOREIGN PATENT DOCUMENTS

| CN | 105893453 A | 8/2016 |

OTHER PUBLICATIONS

Bodziony et al., "Approximate String Matching Optimization for a Database," Application and Drawings, Filed on Oct. 29, 2015, p. 1-40, U.S. Appl. No. 14/926,119.

(Continued)

*Primary Examiner* — Alex Gofman
(74) *Attorney, Agent, or Firm* — Patricia B. Feighan

(57) ABSTRACT

The invention relates to a computer-implemented method for processing a query in a database, the query comprising a search value. The database comprises a plurality of datasets the datasets comprising entries, wherein distance statistics are assigned to the datasets. The distance statistics describe the minimum and maximum distance between the values of the entries of a dataset of the plurality of datasets and a reference value. The method comprises determining the distance between the search value and the reference value, said determination resulting in a search distance, determining a subset of datasets from the plurality of datasets for which the search distance is within the limits given by the minimum and maximum distances described by the respective distance statistics, and searching for the search value in the subset of datasets.

12 Claims, 5 Drawing Sheets

(56) References Cited

U.S. PATENT DOCUMENTS

| | | | |
|---|---|---|---|
| 7,996,369 | B2 | 8/2011 | Li et al. |
| 8,090,745 | B2 | 1/2012 | Hayashi et al. |
| 8,224,830 | B2 | 7/2012 | Bidlack |
| 8,229,734 | B2 | 7/2012 | Bennett |
| 9,141,648 | B1 | 9/2015 | Birnbaum et al. |
| 9,177,227 | B2 | 11/2015 | Chehaiber |
| 9,489,398 | B2 | 11/2016 | Weyerhaeuser et al. |
| 2009/0265340 | A1 | 10/2009 | Barcklay et al. |
| 2010/0005081 | A1 | 1/2010 | Bennett |
| 2010/0106713 | A1 | 4/2010 | Esuli et al. |
| 2010/0125594 | A1 | 5/2010 | Li et al. |
| 2011/0082855 | A1 | 4/2011 | Al-Omari et al. |
| 2012/0041974 | A1 | 2/2012 | Base et al. |
| 2012/0158709 | A1* | 6/2012 | Gaonkar ........... G06F 17/30156 707/723 |
| 2013/0212090 | A1 | 8/2013 | Sperling et al. |
| 2013/0262489 | A1 | 10/2013 | Shirakawa |
| 2014/0095520 | A1 | 4/2014 | Ziauddin et al. |
| 2015/0242452 | A1 | 8/2015 | Dickie et al. |
| 2015/0286682 | A1 | 10/2015 | Ziauddin |
| 2015/0347492 | A1 | 12/2015 | Dickie |
| 2015/0363404 | A1 | 12/2015 | Dickie |
| 2016/0004740 | A1 | 1/2016 | Bendel et al. |
| 2016/0098451 | A1 | 4/2016 | Dickie |
| 2016/0239549 | A1 | 8/2016 | Gaza et al. |
| 2017/0068688 | A1 | 3/2017 | Brodt et al. |
| 2017/0124147 | A1 | 5/2017 | Bodziony et al. |

OTHER PUBLICATIONS

Johnson, "Algorithm of the Week: Damn Cool Levenshtein Automata," Big Data/Analytics Zone, Jun. 25, 2013, p. 1-8, Architects Zone, DZone, Inc., http://architects.dzone.com/articles/algorithm-week-damn-cool-1, Accessed on: Jan. 21, 2015.

Rane et al., "Privacy Preserving String Comparisons Based on Levenshtein Distance," IEEE International Workshop on Information Forensics and Security (WIFS), Dec. 2010, Mitsubishi Electric Research Laboratories, Inc.

Wikipedia, "Approximate String Matching," Wikipedia, the Free Encyclopedia, Last Modified on Oct. 29, 2015, p. 1-4, https://en.wikipedia.org/wiki/Approximate_string_matching, Accessed on Nov. 2, 2015.

Wikipedia, "Hamming Distance," Wikipedia, the Free Encyclopedia, Last Modified on Oct. 29, 2015, p. 1-4, https://en.wikipedia.org/wiki/Hamming_distance, Accessed on Nov. 2, 2015.

Wikipedia, "Levenshtein distance," Wikipedia, the Free Encyclopedia, Last Modified on Jan. 11, 2015, p. 1-7, http://en.wikipedia.org/wiki/Levenshtein_distance, Accessed on: Jan. 21, 2015.

IBM, "List of IBM Patents or Patent Applications Treated as Related (Appendix P)," Mar. 14, 2016, p. 1-2.

Bodziony et al.,"Approximate String Matching Optimization for a Database," Application and Drawings, Filed on Oct. 29, 2015, p. 1-40, U.S. Appl. No. 14/926,119.

Gaza et al., "Method for Processing a Database Query," Application and Drawings, Filed on Feb. 13, 2015, 28 Pages, U.S. Appl. No. 14/621,466.

Anonymous, "Method of Limiting I/O Operations for Spatial Data in Data Warehouses," An IP.com Prior Art Database Technical Disclosure, Jan. 24, 2017, p. 1-5, IP.com No. IPCOM000248962D.

IBM, "List of IBM Patents or Patent Applications Treated as Related (Appendix P)," May 30, 2017, p. 1-2.

Bodziony et al., "Approximate String Matching Optimization for a Database," Application and Drawings, Filed on Apr. 24, 2017, 38 Pages, U.S. Appl. No. 15/494,874.

* cited by examiner

FIG. 1

Example: Distance between the expressions

INTENTION
EXECUTION and between

EFFICIENT
INEFFICIENT

Minimum Edit Distance:

a)
| I | N | T | E | N | T | I | O | N |
| s | s |   | E |   |   |   |   |   |
|   |   |   | d |   |   |   |   |   |
| I |   | E | X | E | C | U | T | I | O | N |
| E | X | E | C | U | T | I | O | N |

5 Editing Steps b)
| E | F | F | I | C | I | E | N | T |
| I | N |   |   |   |   |   |   |   |
| I | N | E | F | F | I | C | I | E | N | T |

2 Editing Steps

FIG. 2

|  |  | Dist$_{Ref1}$ | Range | Dist$_{Ref2}$ | Range |
|---|---|---|---|---|---|
| 102 | Dataset 1 | ESCAPE | 10 | Max 10 | 8 | Max 10 |
| | | AHEAD | 10 | | 9 | |
| | | SOLO | 8 | | 10 | |
| | | STOPWATCH | 9 | Min 8 | 10 | Min 8 |
| | | SLOWDOWN | 8 | | 10 | |
| 104 | Dataset 2 | CONFIDENCE | 9 | Max 10 | 9 | Max 10 |
| | | CHEROKEE | 9 | | 7 | |
| | | IRON | 9 | | 10 | |
| | | COMPANY | 9 | Min 9 | 10 | Min 7 |
| | | EARTH | 10 | | 9 | |
| 106 | Dataset 3 | RESISTOR | 9 | Max 10 | 9 | Max 9 |
| | | MAGNITUDE | 10 | | 9 | |
| | | WAVE | 10 | | 9 | |
| | | FIREARM | 10 | Min 9 | 9 | Min 8 |
| | | CEMENT | 10 | | 8 | |
| 108 | Dataset 4 | CONTRACT | 9 | Max 10 | 10 | Max 10 |
| | | MARKER | 10 | | 9 | |
| | | DISTANCE | 10 | | 9 | |
| | | LENGTH | 10 | Min 9 | 9 | Min 9 |
| | | MOUSE | 9 | | 9 | |

100 — (dataset column bracket); 110 — (distance/range columns bracket)

Reference Values:
Ref$_1$: OOOOOOOOO
Ref$_2$: EEEEEEEEE

FIG. 3

METHOD FOR PROCESSING A DATABASE QUERY

BACKGROUND

The present invention relates to database queries and more specifically, to limiting read operations caused by a database query.

One of the challenges of modern data warehouses is the amount of data which has to be processed per every database query. In a naïve approach for each query the whole database would have to be searched for a single query expression.

To limit the resource consumption and amount of input/output operations on discs an approach introducing low level statistics for the data comprised in the database is known in the art. In this approach some basic statistics are kept for very small chunks of data. For example for each chunk of data the minimum and the maximum value of the entries of a particular column is determined. If a query is asking about data which is determined not to be within the range given by the minimum and maximum value, the chunk of data will not be read from the disc at all, as the searched data will not be found in the data subset.

However, this approach has the limitation that it will not work efficiently for expressions comprising characters as the approach introducing the minimum and maximum value of entries of columns works best for integer- or floating-type entries in a sorted database.

SUMMARY

It is an objective of the present invention to provide for an improved computer-implemented method, computer program product and corresponding control system for processing a query in a database as specified in the independent claims. Embodiments of the invention are given in the dependent claims. Embodiments of the present invention can be freely combined with each other if they are not mutually exclusive.

In one aspect, the invention relates to computer-implemented method for processing a query in a database wherein the query comprises a search value. The database comprises a plurality of datasets and the datasets comprise entries like for example integer values, character values, strings or any other kind of data. The datasets have distance statistics assigned thereto. The distance statistics describe the minimum and maximum distance between the values of the entries of a dataset of the plurality of datasets and a reference value.

Once a query comprising a search value is received the method for processing the query starts with determining the distance between the search value and the reference value wherein said determination results in a search distance. Once the search distance has been determined a subset of datasets from the plurality of datasets is determined for which the search distance is within the limits given by the minimum and maximum distances described by the respective distance statistics. A search for the search value is then only conducted in the subset of datasets.

A "distance" as introduced here describes a measure for a similarity between two expressions. As will be described later on, such a similarity between expressions can be calculated in a plurality of ways. One simple example is the calculation of a Hamming distance, which represents the number of digits two expressions have in common. Further a "distance" in the sense of the present disclosure may refer to a distance between two numbers. In this case, the distance would be the numerical difference between two numbers.

Embodiments may have the advantage that by the described comparison of the similarity of a search value and the reference value on the one hand and the similarity of a reference value and the contents of dataset on the other hand, a pre-selection of datasets which will most likely comprise the value that is searched for can be realized. If it is for example determined that a dataset is way more dissimilar from a reference value than the search value the dataset will not have to be searched for the search value as it is highly unlikely that the search value is comprised in the dataset. As a result the search for a search value in a database can be limited to a reduced number of datasets thereby reducing the number of I/O-operations and the corresponding computational effort for finding a search value in a database.

In some embodiments the reference value is one of a plurality of reference values wherein the distance statistics comprise minimum and maximum distances for each of the reference values. In this case the determination of the search distance is performed for each of the reference values resulting in a set of search distances. The determination of the subset of datasets is then performed for each search distance of the set of search distances. It has to be noted, that according to the embodiment the subset of datasets will only comprise datasets which match the criterion that the search distance is within the limits given by the minimum and maximum distance for each reference value. Thus, if at least for one reference value the search distance is not between the minimum and maximum distance of a dataset, the dataset will not be included into the subset of datasets to be searched for the search value.

Embodiments may have the advantage that by introducing a plurality of reference values instead of a single reference value the granularity of the pre-selection of datasets from the plurality of datasets can be increased. Depending on the search value it may be possible that a single reference value will yield a huge number of datasets for which the search distance is within the limits given by the minimum/maximum distances of the respective distance statistics. This is especially the case, if the search value is highly dissimilar to the reference value or in other words, if the distance between the search value and the reference value is very high. However, the distance of the search value to a second reference value may be way smaller, thereby yielding more information when determining the similarity of the second reference value and the datasets of the database. Therefore the pre-selection of the subset of datasets may be improved by introducing more and more reference values as with an increased number of reference values the possibility for finding one reference value which is very similar to the search value will be increased as well.

In some embodiments the method further comprises determining from the plurality of search distances a minimum search distance and the respective first reference value. In this case, determining the subset of datasets from the plurality of datasets only considers the minimum and maximum distances for the first reference value.

Embodiments may have the advantage that by determining a reference value which is most similar to the search value by determining the minimum search distance, a set of distance statistics can be determined which will provide most representative information on the contents of the datasets for the given search value. If the similarity between the determined first reference value and the contents of a dataset is very high the similarity between the search value and the contents of the dataset will be very high as well.

In some embodiments the number of characters of the reference value is equal or less than the maximum number of characters per entry of the datasets. If for example no entry of the datasets is longer than ten characters no reference value should be chosen such that it is longer than ten characters.

Embodiments may have the advantage that by limiting the number of characters of the reference value to the maximum number of characters of the entries no unnecessary dissimilarity between the reference value and the entries of the datasets is introduced. Referring for example to the Hamming distance, if no entry is longer than ten characters but the reference value is for example 13 characters long the dissimilarity between the entries of the datasets and the reference value will be always equal to or greater than 3.

In some embodiments the datasets and the entries of the datasets are sorted in a lexicographical order, wherein the reference value is a sequence of identical characters. For example one could use 26 reference values wherein a reference value is a sequence of for example ten identical letters of the Latin alphabet. In this case for example the dataset comprising the first ten entries of the database will have a statistically higher similarity to the reference value comprising all A's than for example the last ten entries of the database as the first entries of the database or at least a subset therefrom will start with the letter "A". Thus, at least one of the characters of the database entry is identical with a character of the reference value. As a result the reference values if chosen as described before will function similar to an index indicating transitions between a first starting character of the entries to a second starting character of the entries.

In some embodiments the reference value is an arbitrary sequence of characters.

In yet another embodiment a sequence of characters of the reference value is adapted to the sequences of characters of the values comprised in the entries of the datasets. If for example the database comprises five entries the entries being the words "confidence", "contract", "constitution", "control" and "connection", it may be feasible to choose a reference value which also starts with the letters "con". Another example would be a database comprising internet addresses all starting with "www". Another possibility for adapting the reference value to the values comprised in the entries of the datasets may be to determine the frequency of a certain character on a certain digit of the entries of the database. A reference value may be then chosen such that it only comprises those characters which are found with the highest frequency on the individual digits of the entries.

In some embodiments the reference values are chosen such that for each reference value the distance between the reference value and the remaining reference values is equal to or greater than the maximum possible distance between the reference value and an expression with the same number of characters. If for example the distance is determined by comparing the individual digits of two expressions (Hamming distance) a reference value comprising eight digits should at least have the distance 8 from all other reference values.

Embodiments may have the advantage that by choosing maximum dissimilar reference values the information gained by comparing a search value with the reference values is maximized. If for example two reference values are very similar a comparison of a search value with the reference values may yield the same distance for both reference values. Thus the corresponding distance statistics of the datasets will not bring any additional information, compared to the case in which only one of the reference values is used. Therefore not much information can be obtained by introducing two similar reference values. If however, the reference values are totally dissimilar a comparison with the search value will give more information on the contents of datasets.

In some embodiments the data comprised in the entries is character (CHAR) and/or variable character field (VARCHAR) data.

In some embodiments the distance determined between the value of an entry or the search value and the reference value is a minimum edit distance. The minimum edit distance reflects the minimum number of editing operations which are necessary to get from a first expression to a second expression. For example to get from the expression 'stop' to the expression 'step' it is only necessary to substitute the letter "o" by an "e". Therefore, the minimum edit distance between those two expressions would be 1.

In some embodiments the edit distance is determined according to the Levenshtein Metric. The operations which have to be executed to get from a first expression to a second expression are usually the substitution of a letter, the deletion of a letter or the insertion of a letter. In accordance with the Levenshtein Metric each of these operations has an assigned cost value. By counting the overall cost of all operations necessary to get from a first expression to a second expression the Levenshtein distance between two expressions can be determined.

Embodiments may have the advantage that the Levenshtein Metric is easy to calculate and thus the distance statistics for the datasets could for example be calculated when filling the database with entries, thereby not causing too much overhead in determining the corresponding distance values.

In another aspect the invention relates to a method for determining distance statistics for a dataset, the dataset comprising entries. The method comprises defining at least one reference value and for each of the entries determining a distance between the value of the entry and the reference value. This determination results in a set of distances. From this set of distances the minimum distance and the maximum distance is determined. Both the determined minimum distance and maximum distance are then assigned to the dataset as distance statistics.

In yet another aspect the invention relates to a computer program product comprising computer-executable instructions to perform the method step of the method described about.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

BRIEF DESCRIPTION OF THE SEVERAL VIEWS OF THE DRAWINGS

In the following embodiments of the invention are explained in greater detail, by way of example only, making reference to the drawings in which:

FIG. 1 depicts an illustration describing a first possibility to calculate a distance between two expressions.

FIG. 2 depicts an illustration describing a second possibility to calculate a distance between two expressions.

FIG. 3 depicts an example of a database and corresponding distance statistics.

DETAILED DESCRIPTION

Figure 1:
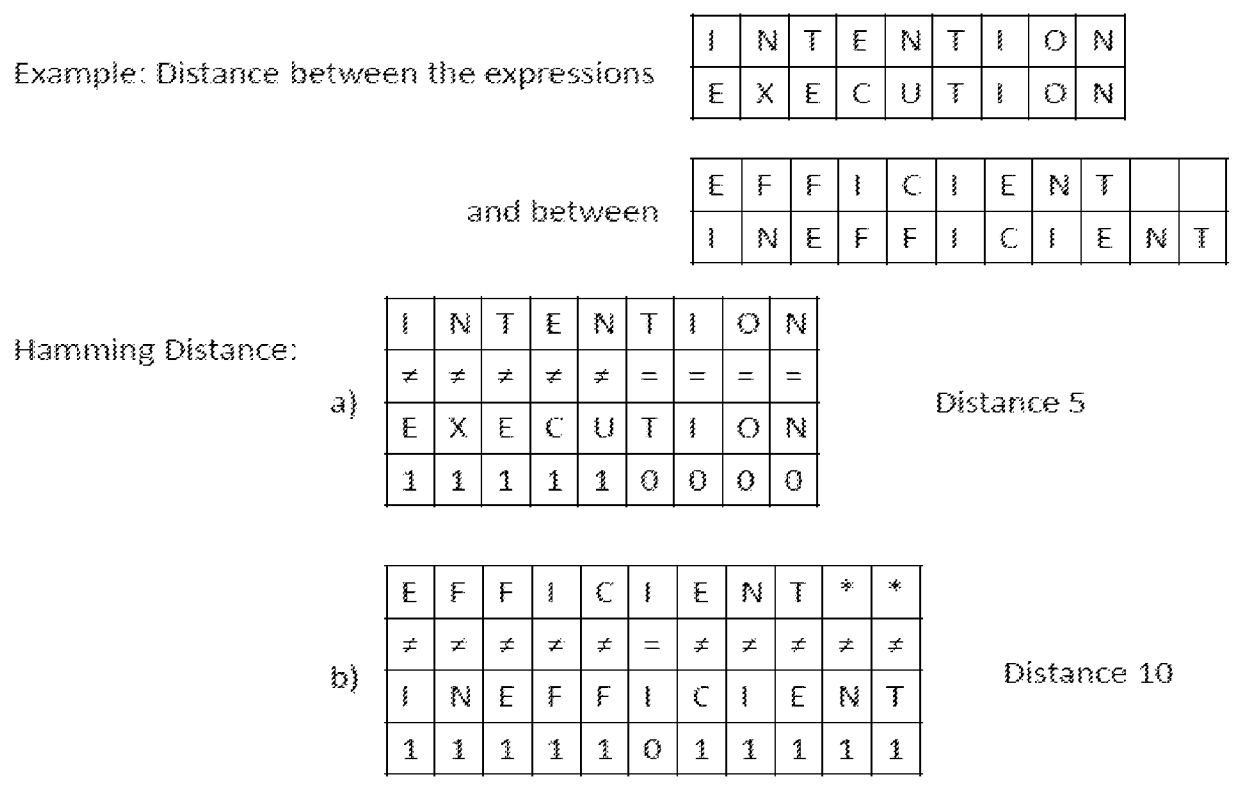
Figure 4:
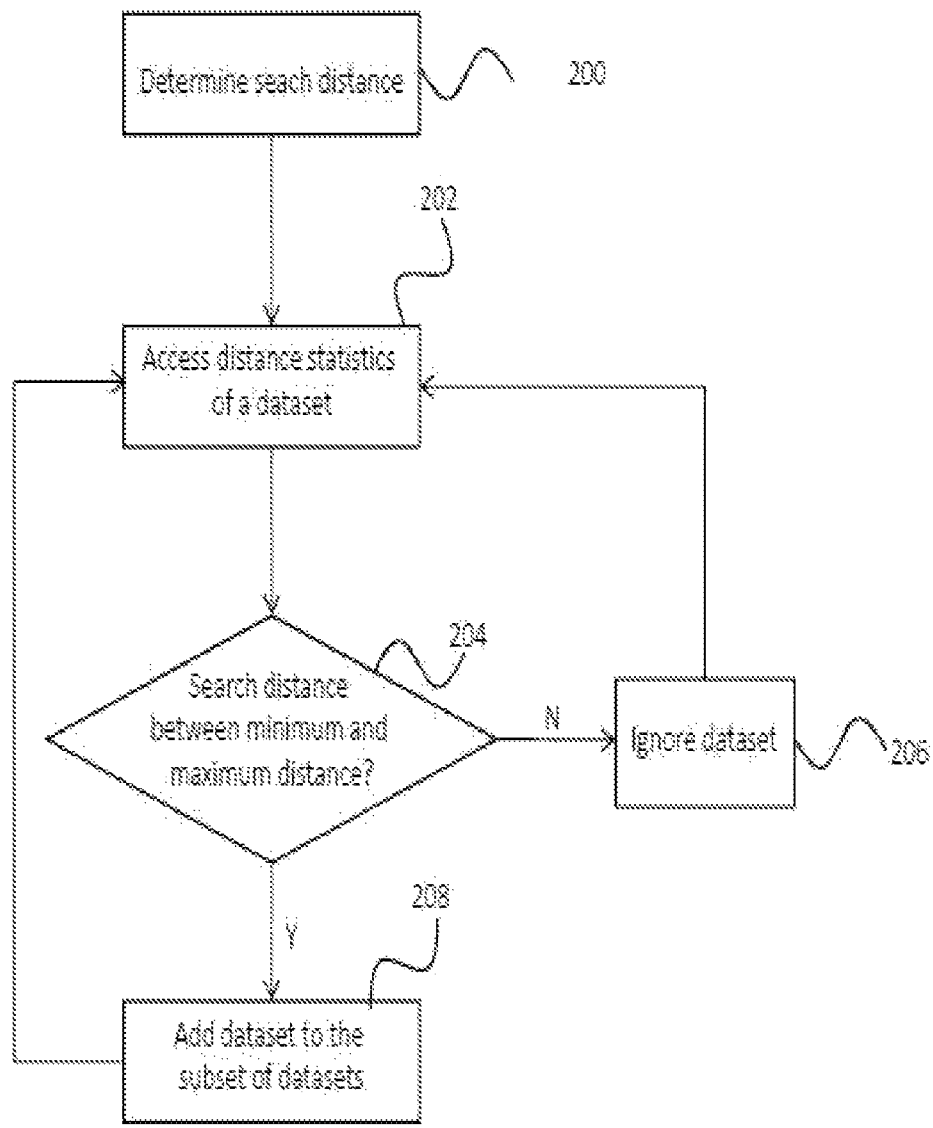
FIG. 4 depicts a flow diagram of a method for determining a subset of datasets.

FIG. 1 is an example on how to determine the distance between two expressions. In the example depicted here there are two pairs of expressions: "INTENTION" and "EXECUTION" as a first pair, as well as "EFFICIENT" and "INEFFICIENT" as a second pair. In the first example depicted in FIG. 1, the Hamming distance between the expressions "INTENTION" and "EXECUTION" is determined.

The Hamming distance describes in how many digits two expressions differ. As shown in FIG. 1 a) the first five digits of the two expressions are not identical. The last four digits, "T", "I", "O", and "N" are the same digits for both expressions. Thus, the hamming distance between the expressions, "INTENTION" and "EXECUTION", is five as five digits are not identical for both expressions. Determining the Hamming distance between two expressions may be an easy way to determine a distance, however, two expressions might be very similar while the Hamming distance between the two expressions is very large. For example as depicted in FIG. 1 b) a first expression is "EFFICIENT" and the second expression is "INEFFICIENT". As the individual characters of the common part of the two expressions which is "EFFICIENT" are shifted by two letters, the Hamming distance between those two expressions would be 10 as only the sixth digit "I" is the same for both expressions. Thus the Hamming distance is determined to be very high, even though the two expressions are quite similar.

Another example for determining a distance between two expressions is depicted in FIG. 2 and is called the Minimum Edit Distance. The Minimum Edit Distance describes how many editing steps have to be performed in order to get from a first expression to a second expression. As in FIG. 1 a) the two expressions for the example in FIG. 2 a) are "INTENTION" and "EXECUTION".

In a first step, three letters of the expression "INTENTION" are substituted by other letters. The digits which are substituted are the second, third and fifth digit of the expression. The substitution of letters is herein indicated by an "s". In a subsequent step the first letter of the expression is deleted, as indicated by a "d". To get from the thus found expression to the expression "EXECUTION" the letter "C" has to be inserted between the "E" and "U", as indicated by the small "i". As a result, five editing steps are necessary to get from the expression "INTENTION" to the expression "EXECUTION": three letter substitutions, on letter deletion and one letter insertion. Of course there may be other ways to get from the first expression to the second expression, yet as indicated by the name "MINIMUM" Edit Distance, the minimum edit distance always corresponds to the minimum number of editing steps.

If in the example depicted in FIG. 2 a) each operation has the cost value 1, this would result in a total distance between the two expressions of 5. However, it is also possible to assign other cost values to the different operations. For example the substitution of a letter by another letter could be assigned to a cost value of 2. In this case the distance between the expressions "INTENTION" and "EXECUTION" would be 8. This assigning of cost value to the individual editing operations can be adapted to the types of entries in the database.

Coming back to the previously mentioned example of the similarity of the two expressions, "EFFICIENT" and "INEFFICIENT", the minimum edit distance between efficient and inefficient would be 2 as only two letters would have to be inserted to get from "EFFICIENT" to "INEFFICIENT", as is shown in FIG. 2 b). Therefore the distance between those two expressions would be 2 as compared to the previously described Hamming distance between those two expressions being 11. Therefore, care is to be taken when defining which distance is to be used.

The example depicted in FIG. 1 is only directed towards expressions comprising letters. However, if the database comprises for example numbers (integer, float, . . . ) the distance between two numbers could be defined as the numerical difference between two numbers. However, it would also be possible to use the minimum edit distance to get from a string of numbers to another string of numbers.

FIG. 3 is an example of a database 100 comprising 20 entries. The 20 entries are the words escape, ahead, solo, stopwatch, slowdown, confidence, Cherokee, iron, company, earth, resistor, magnitude, wave, firearm, cement, contract, marker, distance, length, and mouse. Those 20 expressions are sub-divided into four datasets 102, 104, 106, and 108, each dataset comprising five expressions. Assigned to those datasets are distance statistics 110. In the following, the determination of those distance statistics 110 will be discussed as well as an example of a database query.

In the example depicted in FIG. 3 the two reference values are a sequence of 10 times the letter "O" as reference value 1 ($Ref_1$) as well as a sequence of 10 times the letter "E" as reference value 2 ($Ref_2$). Choosing a length of the reference value of ten digits is plausible as the longest entry in the database, which is 'confidence', comprises ten digits as well.

Focusing on the first dataset 102 the determination of the individual distances of the expressions comprised in the first dataset 102 to the first reference value ($Ref_1$) is described in the following.

The first expression, 'escape', has no letters in common with the reference value $Ref_1$. If the distance is defined as the minimum edit distance between two expressions wherein each editing operation has a cost value of 1, the distance between the expression, 'escape' and a sequence of ten O's is 10. As the subsequent expression, 'ahead', also has no letters in common with the reference value the corresponding distance is 10 as well. The third expression of the first dataset 102, is 'solo'. As the word "solo" has two letters in common with the first reference value $Ref_1$, the distance between the third database entry and the first reference value $Ref_1$ is 8. The fourth entry of the first dataset 102 which is "stopwatch" only has one letter in common with $Ref_1$, therefore the distance is 9. The fifth entry of the first dataset 102 which is "slowdown" has two digits in common with the first reference value, therefore the distance is 8.

As a result for the first dataset 102 the minimum distance of an entry from the first reference value is 8, wherein the maximum distance of the entries of the first dataset 102 from the first reference value is 10. This information is stored in the distance statistics 110.

The determination of the distance statistics for the remaining datasets 104, 106, and 108 is conducted accordingly. The results for the minimum and maximum distances of the datasets from the first reference value are given in FIG. 3. The same determination of distance values is also conducted for the second reference value $Ref_2$ which is 10 times the letter "E". While the first expression of the first dataset 102, 'escape', has a distance of 10 from the first reference value $Ref_1$, the distance between the expression 'escape' and the second reference value $Ref_2$ is only 8 as the expression 'escape' comprises two e's. Therefore, the distance statistics for the second reference value differ from the distance statistics for the first reference value.

As the determination of the distance statistics as described before, will not produce a significant computational effort the determination of the distance statistics could for example be executed once the database is loaded with entries. To this end reference values should be defined prior to or shortly after filling the database with entries.

To give an example of a database query, for example a query for the expression 'Cherokee' could be received. To limit the read operations on the database depicted in FIG. 3 a first step would be to determine the search distance between the expression that is searched for and one of the reference values. For example the distance between the term 'Cherokee' and the first reference value $Ref_1$ is 9. As can be seen from the distance statistics 110 every dataset provides a range of distances comprising the value 9. Therefore, a search for the term 'Cherokee' would have to be executed in each of the datasets if the first reference value is used for selecting a subset of datasets.

If however, the search distance is determined using the second reference value $Ref_2$, it is determined that the term 'Cherokee' has a distance of 7 to the second reference value. As can be seen from the table depicted in FIG. 2, only the second dataset 104 provides a range of distances including a distance of 7. Therefore, in accordance with the present disclosure, the search for the term 'Cherokee' would only be executed in the second dataset 104 as the distance statistics indicate that the term 'Cherokee' will not be found in the datasets 102, 106 and 108. As a result only one fourth of the database would have to be searched in order to find the search value comprised in the database query.

FIG. 4 is a flow diagram illustrating the method for processing a query in a database. In accordance with embodiments the query comprises a search value. In a first method step 200 a search distance is determined by determining the distance between the search value and a reference value.

Once the search distance has been determined in step 200, the distance statistics of a first dataset are accessed in step 202. In Step 204 it is determined whether the search distance is within the limits given by the minimum and maximum distance comprised in the distance statistics of the dataset. If it is determined that the search distance is not within the limits given by the distance statistics of the dataset, the dataset not added to the subset of datasets which are to be searched for the search value and is therefore ignored for the search 206. The method than goes back to step 202 and the distance statistics for another dataset are accessed.

If it is however determined that the search distance in fact is between the limits given by the minimum and maximum distance comprised in the distance statistics of the dataset, the dataset is added to the subset of datasets in step 208. The steps 202, 204, 206 and 208 are then repeated for each dataset comprised in the database which is to be searched for the search value, wherein the repetition of steps 202, 204, 206 and 208 results in a subset of datasets which are then searched for the search value.

Figure 5:
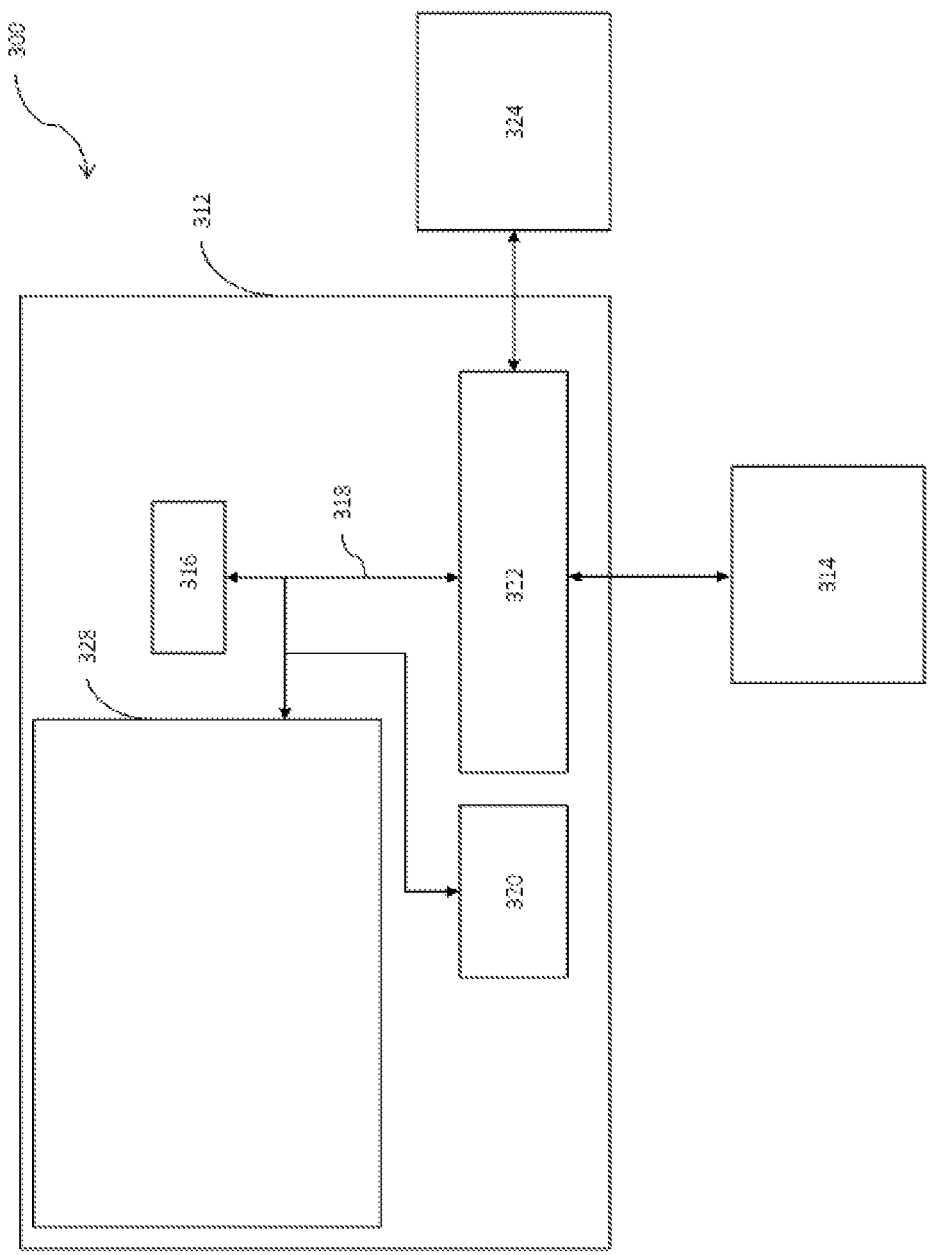
FIG. 5 depicts a block diagram of a computer system.

FIG. 5 shows a computer system (or server) 312 in system 300 in the form of a general-purpose computing device. The components of computer system 312 may include, but are not limited to, one or more processors or processing units 316, a memory system 328, and a bus 318 that couples various system components including memory system 328 to processor 316.

Computer system 312 typically includes a variety of computer system readable media. Such media may be any available media that is accessible by computer system 312, and it includes both volatile and non-volatile media, removable and non-removable media.

Memory system 328 may include computer system readable media in the form of volatile memory, such as random access memory (RAM) and/or cache memory. The memory system may include one or more active buffered memory devices. The active buffered devices may include a plurality of memory elements (e.g., chips). The active buffered memory device may include layers of memory that form a three dimensional ("3D") memory device where individual columns of chips form vaults in communication with the processing units 316. The active buffered memory device may comprise partitions that may be concurrently accessed by a plurality of processing elements, where the partitions may be any suitable memory segment, including but not limited to vaults.

The processing units 316 may issue requests to the memory system, utilizing the dynamic array data structure and associated metadata to implement an application.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via I/O interface(s) 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing a query in a database, the method comprising:
    determining a plurality of reference values for a plurality of datasets with entries associated with the database, wherein the database is stored on a first computer, wherein a number of characters in each reference value within the determined plurality of reference values is equal to or less than a maximum number of characters per entry of the datasets, wherein determining the plurality of reference values comprises determining a frequency of a certain character on a certain digit of the entries of the database and selecting each reference value within the plurality of reference values based on a plurality of characters being found with a highest frequency on a plurality of individual digits per entry of the datasets, and wherein a sequence of the plurality of characters associated with each reference value within the plurality of reference values is adapted to a plurality of sequences of characters of the plurality of values of the entries of the dataset;
    assigning the determined plurality of reference values to the plurality of datasets with entries associated with the database;
    assigning a plurality of distance statistics to the plurality of datasets associated with the database, wherein the assigned plurality of distance statistics describe a minimum and a maximum distance between a plurality of values of the entries of a dataset within the plurality of datasets and an assigned reference value within the assigned plurality of reference values;
    receiving, from a second computer, the query associated with the database, wherein the received query comprises a search value;
    identifying the search value within the received query;
    determining a search reference value based on the identified search value, wherein a first three characters of the identified search value matches a first three characters of the determined search reference value;
    determining the distance between the identified search value and the determined search reference value, said determination resulting in a search distance;
    determining a subset of datasets from the plurality of datasets for which the search distance is within a limit given by the minimum and maximum distances described by the respective distance statistics; and
    searching for the search value in the subset of datasets.

2. The computer-implemented method of claim 1, wherein the reference value is one of a plurality of reference values, wherein the distance statistics comprise minimum and maximum distances for each of the reference values, wherein the determination of the search distance is performed for each of the reference values resulting in a set of search distances, wherein the determination of the subset of datasets is performed for each search distance of the set of search distances.

3. The computer-implemented method of claim 2, wherein the method further comprises determining from the plurality of search distances a minimum search distance and the respective first reference value, wherein when determining the subset of datasets from the plurality of datasets only the minimum and maximum distances for the first reference value are considered.

4. The computer-implemented method of claim 1, wherein a number of characters of the reference value is equal or less than a maximum number of characters per entry of the datasets.

5. The computer-implemented method of claim 1, wherein the datasets and the entries of the datasets are sorted in a lexicographical order, wherein the reference value is a sequence of identical characters.

6. The computer-implemented method of claim 1, wherein reference value is an arbitrary sequence of characters.

7. The computer-implemented method of claim 1, wherein a sequence of characters of the reference value is adapted to the sequences of characters of the values comprised in the entries of the datasets.

8. The computer-implemented method of claim 1, wherein the reference values are chosen such that for each reference value the distance between the reference value and the remaining reference values is equal or greater than the maximum possible distance between the reference value and an expression with the same number of characters.

9. The computer-implemented method of any of claim 1, wherein the data comprised in the entries is character (CHAR) and/or variable character field (VARCHAR) data.

10. The computer-implemented method of claim 1, wherein the distance determined between the value of an entry or the search value and the reference value is a minimum edit distance.

11. The computer-implemented method of claim 10, wherein the edit distance is determined according to the Levenshtein-Metric.

12. The computer-implemented method of claim 1, further comprising:
    defining at least one reference value for a plurality of entries determining a distance between a value of an entry within the plurality of entries and the reference value, said determination resulting in a set of distances, wherein each entry within the plurality of entries is associated with a dataset;
    determining from the set of distances the minimum distance and the maximum distance; and
    assigning the determined minimum and maximum distance as distance statistics to the dataset.

* * * * *